Sept. 27, 1960          W. BRODBECK          2,953,974
PROFILE MILLING MACHINE, ESPECIALLY ENGRAVING MACHINE
Filed Sept. 9, 1958          2 Sheets-Sheet 1
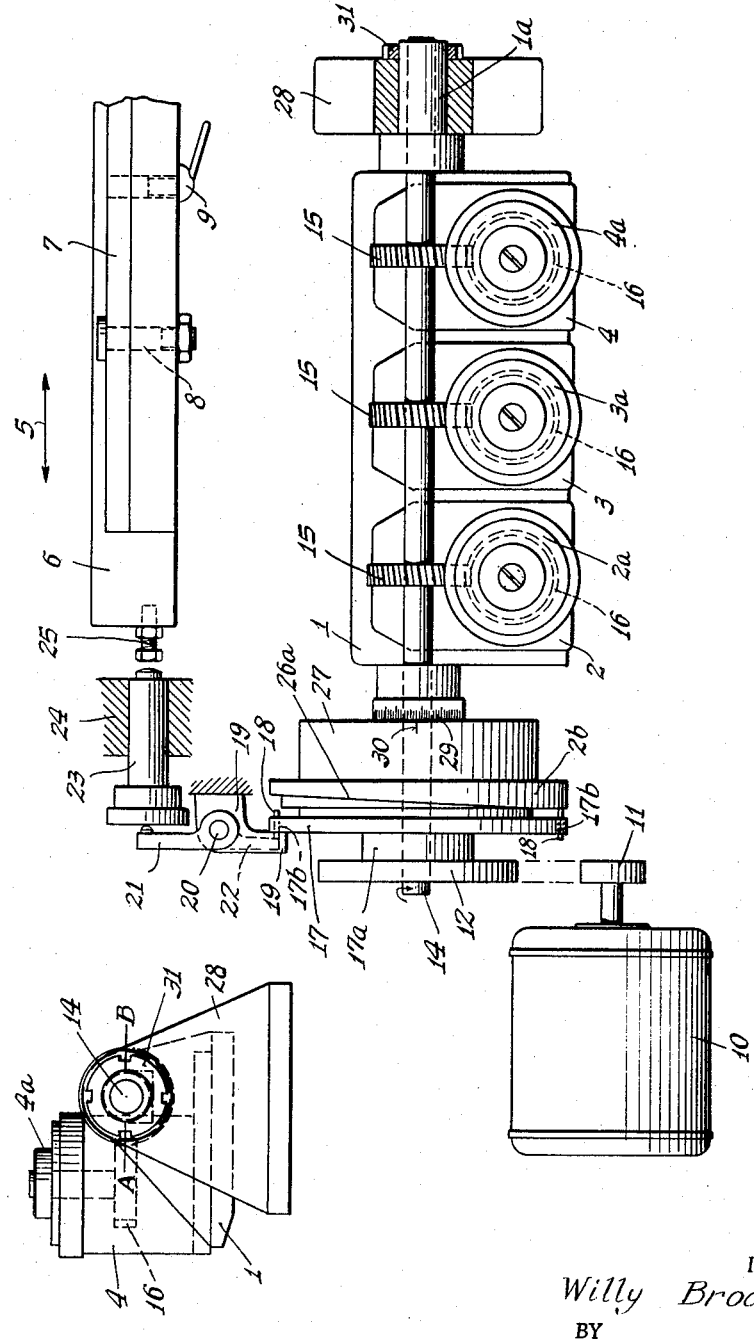
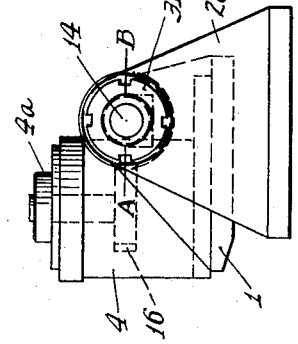
INVENTOR.
Willy Brodbeck
BY
Munn, Liddy, Daniels & March
ATTORNEYS

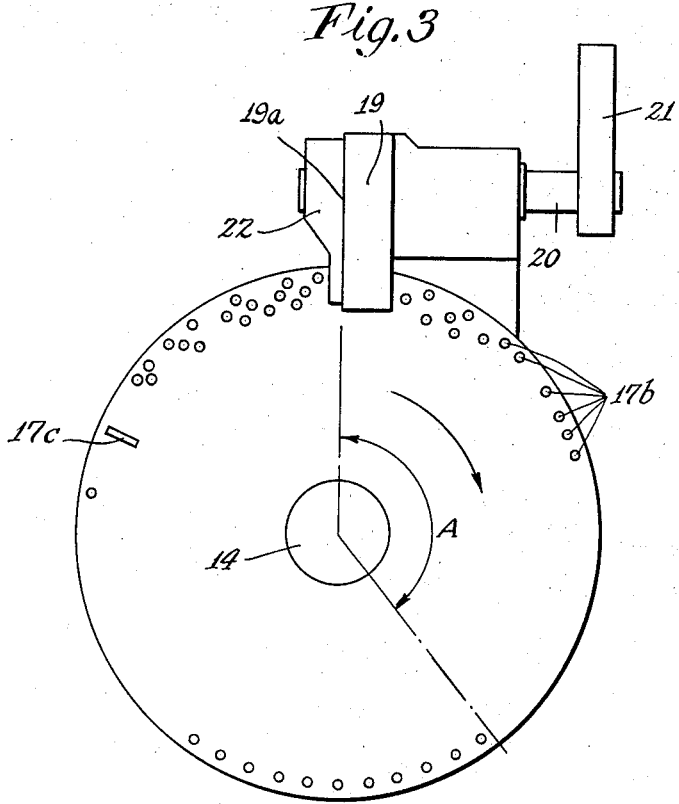
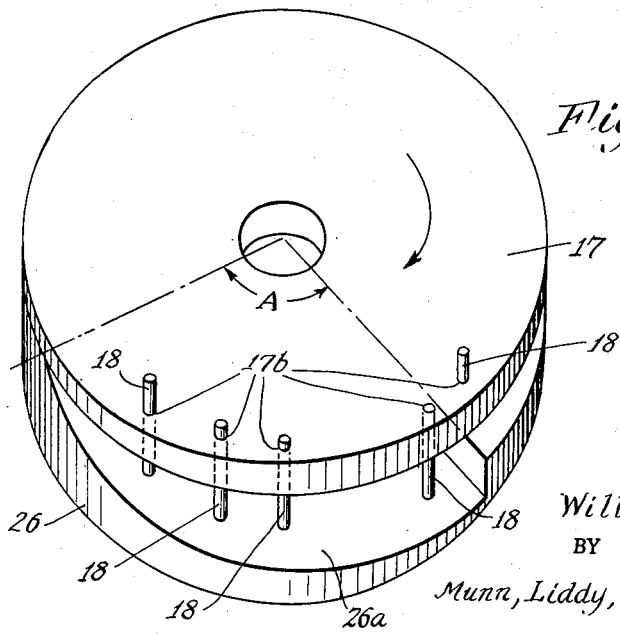

United States Patent Office 2,953,974
Patented Sept. 27, 1960

2,953,974
PROFILE MILLING MACHINE, ESPECIALLY ENGRAVING MACHINE

Willy Brodbeck, Calmbach (Enz), Germany, assignor to Alfred Gauthier G.m.b.H., Calmbach (Enz), Germany, a corporation of Germany Filed Sept. 9, 1958, Ser. No. 759,886

Claims priority, application Germany Sept. 12, 1957

13 Claims. (Cl. 90—15.1)

This invention relates to profile milling machines which are semi-automatic in their operation, and more particularly to machines of this type which are adapted to perform a number of operations, such as engraving cuts, on the workpieces.

In machines of the above kind a well-known arrangement is to mount the workpiece supporting devices for rotation on a common carrier or mounting member. Such organization enables various parts of a workpiece to be progressively presented to the cutting tool, to effect the desired milling, profiling or engraving cuts. Where, for example, the engraving of a certain letter, figure or other configuration is to be effected, different portions of the workpiece may be advanced or sequentially presented to the cutting tool as required by the design which is to be made. An advantage of periodically shifting or indexing the workpiece in this manner resides in the fact that the milling tool or cutter may have a simpler advancing movement in effecting the required cut, and other movements which might be required to produce the necessary contour or profile are obtainable by controlling the support or carrier member for the workpiece mounting.

Accordingly, only relatively small shifting movements are required of the workpiece support, in conjunction with and coordinated to the advance of the milling tool, resulting in a reliable operation and performance of the control devices by which such shifting is effected.

However, with well-known machines of the above type certain disadvantages exist in connection with the control of the workpiece support member, especially as regards the satisfactory actuation of said member and the cost of the equipment which is required for positioning and holding the workpiece supports in the various required positions. A further disadvantage ensues because of the time which is required and involved in effecting the proper shifting movements of the workpiece support, and the set-up time which is necessary to effect a change of the control program, e.g. a change of the figure which is to be engraved or changes between the different relative positions of the workpiece supports. Such disadvantages result in difficulty and complications in the manufacturing process and in the operation of the milling machine equipment, and defeat the economical use of these well-known profile milling or engraving machines.

An object of the present invention is to provide a novel and improved profile milling or engraving machine wherein the above disadvantages are obviated. This is accomplished while still retaining a control and actuation of the workpiece supports whereby the same are rotatably arranged and adapted to fully rotate on the workpiece carrier member, said machine however being characterized by relatively few, inexpensive components and a desirably simplicity of the same, together with reliable and trouble free operation. Another object of the invention is to provide an improved profile milling machine as above set forth, wherein there is an appreciably increased rate of production, thereby enabling a given machine to produce a larger number of finished articles in a given time. This is accomplished, in accordance with the invention, by providing a much more rapid indexing movement of the workpieces whereby less time is involved in shifting the work (which operation is non-productive) even when the workpieces must be shifted through relatively large distances. A further object of the invention is to provide an improved profile milling machine of the above type and as defined, wherein the rotatably workpiece supports are precisely and accurately positioned and securely held in their various positions while being machined by the milling cutters. A feature of the invention resides in the provision of an improved milling machine as above set forth, wherein changes in the positioning of the workpiece holders, as for the purpose of effecting a new control program, may be easily and quickly effected or carried out, in an extremely simple and easily observed manner, particularly where changes are to be effected in the degree or amount of indexing movement of the workpiece supports between subsequent milling operations.

The above objects are accomplished, in accordance with the invention, by providing in conjunction with rotatable workpiece supports which are mounted on a common carrier for the workpieces, a rotating-field type of electric motor and a turnable, fully rotatable or rotary member, the latter constituting a part of the drive means between the motor and the rotatable workpiece holders or supports. The said turnable or rotary member is provided with a plurality of stops or projecting lugs adapted to cooperate with a fixed stop which is preferably mounted on the machine frame or base, the number and circumferential positions of the stops or lugs which are carried by the said rotary member determining the number of rest positions and the arcuate disposition of not only the workpiece holders but also the said rotary member and the rotating field electric motor armature. Such rest positions of the workholders are dictated by the control program which is laid out to effect the desired letters, figures or other profiles or configurations on the workpieces. The said rotating-field electric motor is a motor of the type which is capable of being stalled while continually energized without drawing excessive current or causing an excessive amount of heat to be produced. I further provide means for effecting release of the halted stops or lugs which are provided on the rotary member, in response to movement of a control part of the profile milling machine, thereby to enable the rotary member and workpiece holders and motor to proceed again until halted by the next stop lug on the rotary member as such next lug engages the fixed stop on the machine base. Such control part of the profile milling machine may, for example, constitute a carrier member for the milling or cutting tools, which carrier member is adapted to advance or travel between advanced, work-performing positions and a retracted non-working position the latter being characterized by removal of the cutting tools from the workpieces.

As above mentioned, the specified rotating field electric motor refers to the type of motor in which the armature may be stalled or halted while the motor is fully energized, without causing the motor to draw excessive current or produce excessive heat which might for example result in burned-out windings.

Upon such a motor being released the armature thereof will immediately continue its turning or driving movement until it is again halted or stalled by a sufficiently powerful force or load. Due to the fact that the operation of a motor of this type involves what is known as a traveling or rotating field, such a motor is referred to herein as a rotating field electric motor.

A profile milling machine as thus constructed in accordance with the invention is characterized by the use of relatively few components to effect quick and reliable actuation or indexing of the workpiece supports. Moreover, the structures involved are extremely simple and reliable in their operation, and the arranging and changing of the program means and in fact the entire driving means for the workpiece supports is readily observed and easily understood. By virtue of a simple direct drive made possible by the rotating-field type of motor, the path of movement of the workpiece supports and the extents of movement thereof may be easily and quickly changed, and the time consumed in shifting or indexing the workpiece supports may be considerably reduced, even where large amounts of travel are involved. Moreover, it is possible to accurately and reliably position the workpiece supports at all times that these are being indexed and the pieces worked on, by virtue of the abutting relationship of the fixed, unyieldable stop and movable stop lugs, in conjunction with the continual force which is being exerted on the drive means by the motor even when the latter is stalled. Accordingly, an exact and precise positioning of the workpiece supports in their various preselected positions is had at all times, resulting in a desirable high accuracy in the milling operations. Moreover, by effecting the various at-rest working positions of the workpiece supports in the above-mentioned simple manner, it is possible to quickly and easily change the control program for the workpiece supports when this should be desired, since it is only necessary to relocate the individual stop lugs which are mounted on the turnable or rotary member carrying the same, or to provide additional stop lugs or remove certain of the stop lugs, as required. Thus, the locating of the workpiece supports in any desired angular positions of rest for the performing of milling operations thereon may be effected without difficulty and various different distances may be had between adjoining positions of rest, as required by the particular design, letter or configuration which is to be produced.

In order to obtain a reliable and precise operation of the program control means and to enable the same to be easily laid out or changed at will, it is advantageous to arrange the stop lugs which are carried by the rotary program member so that they are movably mounted thereon and cooperate with or about the fixed stop which is preferably securely mounted on the machine frame or base. By such organizations the disengagement of the stop lugs with the fixed stop may be easily and effectively carried out.

Where the rotary program member which carries the stops is constituted as a disc there results a desirable economy of manufacture together with simplicity of structure while at the same time there is obtained a reliable operation and a precise positioning of the workpiece supports. Also, a high degree of flexibility is had as regards the positioning and changing of the stop lugs, as well as with regard to the number of the said lugs, particularly when such lugs are carried in bores or sleeves which are provided in the disc with their axes parallel to the axis of turning of the disc. In such bores, cylindrical pins or plates may be accurately supported and easily shifted.

For the purpose of providing for automatic actuation of the said shiftably mounted stop lugs on the rotary program disc a return mechanism or device may be provided, by means of which the stop lugs after having been shifted in a direction to disengage them from the fixed stop of the machine frame, are automatically returned to their initial operative positions before they again reach the said fixed stop during the turning movement of the program disc. The said lug return mechanism may be advantageously constituted as a fixed cam device which is disposed adjacent the turnable program disc. Such organization is not only inexpensive to produce, but insures a reliable operation of the program mechanism at all times. The said control cam may act in a direction which is parallel to the axis of the turnable disc, to shift the said stop lugs axially or longitudinally in their respective bores or sleeves. I have found it to be advantageous to provide a mechanical reduction in the drive means between the rotating-field electric motor and the rotatable workpiece supports, since such reduction functions to further securely hold the workpiece supports in their different consecutive rest positions against any movement while the workpieces are being machined by the milling cutters. Such reduction-type drive means may be advantageously constituted, for example, by a pair of pulleys and a belt running over the said pulleys.

Further, in accordance with the invention, the field of usefulness of the profile milling or engraving machine may be greatly extended, and adjustment of the machine greatly facilitated without complication, enabling the machine to be readily adapted for the producing of various different kinds of workpieces, where there is provided a common single drive shaft which is coupled to all of the workpiece supports and which is connected so as to be driven by the rotating-field electric motor. The coupling of the said common drive shaft to the workpiece supports may be effected by pairs of spiral gears, and the workpiece supports may be advantageously mounted on a rotatably adjustable carrier member which is arranged coaxial with the said common drive shaft and which member may be adjustably secured in various different rotative positions by means of a suitable clamping device.

An embodiment of the invention is illustrated in the accompanying drawings.

Figure 1 is a schematic representation of the top of a control device as provided by the invention, involving rotatably mounted workpiece supports disposed on a common carrier member in a profile milling or engraving machine.

Fig. 2 is a right end elevational view of the control device shown in Fig. 1.

Fig. 3 is a fragmentary left end elevational view of the control device of Fig. 1.

Fig. 4 is a perspective view of the rotary program dial or disc carrying the movable stop lugs, which are shown as cylindrical pins.

Referring to Figs. 1 and 2, the common carrier member for a number of rotatable workpiece supports in a profile milling and engraving machine is indicated by the numeral 1. The carrier member 1 is shown as rigidly mounting three supporting housings 2, 3 and 4 which at their upper portions carry turnable and fully rotating workpiece supports, heads or nests 2a, 3a and 4a respectively. The heads or nests 2a, 3a, and 4a are adapted to each carry a single workpiece, which may be chucked thereon by means of any suitable chucking device (details of which are not shown herein). The machining of the workpieces carried by the heads 2a, 3a and 4a is performed by individual cutters, each of which may be mounted on a tool spindle arranged above the respective supporting head. The tool spindles in turn may be carried on a common member or carriage, which is preferably constituted as a slide shiftable in suitable guides. The workpiece carrier 1 could also, if desired, be mounted for shifting movement, as from right to left or vice versa. In such case, the tool supporting carriage could be arranged for shifting movement in a vertical direction. The arrangement and construction of such shiftable carriages for the workpieces and the tools are well known and not the subject of the present invention; therefore, for the purpose of clarity of illustration, details of such organizations are not illustrated in the figures.

The tool spindles which carry the cutting or milling tools are also not shown herein for reasons of clarity of illustration. Such tool spindles, as is well understood, may be shiftable with respect to the workpiece support heads 2a, 3a and 4a in a direction away from the paper as viewed in Fig. 1, in order to disengage the cutters from the workpieces. Opposite shifting movement of the tool spindles will then cause engagement of the cutters with the workpieces. Such shifting of the tool spindles is preferably accomplished by mounting the common carriage for the spindles in suitable vertical guides, as for example pillar guides which extend in directions vertical to the plane of the paper as when considering Fig. 1. Such vertical shifting movement of the tool spindles may be effected in response to left or right shifting movement of the tool carriage 6, as indicated by the directional arrows 5 shown in Fig. 1. The tool carriage 6 may, for example, carry an adjustable cam part 7 which may be pivotally mounted about a spindle or pivot 8 secured to the tool carriage. The different adjusted positions of the cam 7 may be secured by means of a clamp or locking screw 9, and it will be understood that the cam 7 is thus tiltable through an angle with respect to the plane of the paper, when considering Fig. 1. Depending on the amount of inclination of the cam 7, the tool carriage 6 may be shifted vertically or in directions toward and away from the plane of the paper by different amounts in response to a predetermined left or right movement of such carriage. It will be understood that the three tool spindles and carriers which are intended to perform operations on the workpieces of the rotary work support heads 2a, 3a and 4a are mounted on the said carriage 6. The shifting of the tool carriage 6 is effected by a control device which forms no part of the present invention and is therefore not illustrated herein for purposes of clarity of illustration.

In accordance with the invention I provide a novel control device for effecting various different rotative or arcuate positionings of the tool support heads or nests 2a, 3a and 4a which are turnably mounted on and fully rotatable with respect to the common carrier member 1. Such control means comprises a rotating field type of electric motor and a rotatably mounted or rotary member coupled to the motor and to the workpiece support heads, said rotary member being provided with a number of stop members or lugs adapted to abut or engage a fixed and unyieldable stop which is preferably mounted on the machine frame or base. The number and circumferential positions of the stop lugs on the said rotary member correspond to and determine the number of rest or working positions and the arcuate disposition of the rotary workpiece support heads 2a, 3a, 4a within a given working program. In addition to this, I provide a means for effecting release of the stop lugs on the rotary member from the fixed stop, in response to retracting movement of the tool carriage 6 or other control part of the machine. By such release means the rotary member which has been stopped by engagement of one of the lugs thereof within the fixed stop is permitted to again resume its rotation until it is again stopped by another of the stop lugs which it carries.

The rotating-field electric motor, the operating characteristic of which has been explained above, is indicated at 10 in Figure 1. The drive means between such motor and the rotary work support heads 2a, 3a and 4a includes a pair of pulleys 11 and 12 and a suitable belt 13 passing around the said pulleys. The pulley 12 is shown as carried by a drive shaft 14 which is coupled to the work support heads 2a, 3a and 4a so as to drive the latter. Such coupling between the shaft 14 and the work support heads embraces a positive drive, in accordance with the invention, which serves a special purpose as described below in detail, the said positive drive comprising pairs of spiral gears 15 and 16 the functioning of which may be readily understood from an inspection of Figs. 1 and 2.

Further, in accordance with the present invention, the rotary member which carries the stop lugs is constituted as a disc 17 mounted on the drive shaft 14 by means of a hub 17a. The stop lugs which are carried by the disc 17 comprise pins 18 as shown in Fig. 1, said pins being slidable in bores 17b the axes of which extend in directions parallel to the axis of the drive shaft 14. Cooperable with the stop lugs 18 there is further provided a fixed, unyielding stop 19 which is preferably rigidly secured to the machine frame or base as indicated. On the supporting portion or base of the fixed stop 19 there is provided a bore, through which a shaft 20 passes. Fixed to the ends of the shaft 20 are one-armed levers 21 and 22, Figs. 1 and 3, the lever 22 being disposed immediately adjacent the fixed stop 19 and preferably in engagement therewith as shown. The one-armed lever 21 is cooperable with a slide 23 which is shiftable in a fixed bearing or guide 24 carried by the machine frame. The slide 23 in turn is engageable and shiftable by the tool carriage 6, and for this purpose the said carriage is provided with an adjustable drive or abutment screw 25.

Further, in accordance with the present invention, I provide adjacent the rotary member or disc 17 a fixed control cam 26a, which is arranged to act in a direction parallel to the axis of turning of the disc 17. The control cam 26a is preferably constituted as a circular or cylindrical piece 26, said piece being rigidly carried by a bearing block 27 which may be mounted on the machine frame. The sloping portion or cam face 26a of the piece 26 extends along only a portion of the circumference of the said piece and is inclined in such a way that at a point adjacent the lever 22 and the fixed stop 19 it is spaced the greatest distance from the rotary member or disc 17. The cam face 26a is adapted to engage the movable stop lugs 18 which are carried by the rotary member or disc 17, and to shift the said lugs from right to left as viewed in Fig. 1 after the lugs have first been shifted in an opposite direction by the action of the lever 22 turning in response to right-to-left shifting movement of the tool carriage 6.

The manner of operation of the present improved control device as provided by the invention is as follows:

When the rotating field electric motor 10 is energized, the pulley 11 thereof will drive the belt 13 and pulley 12, together with the shaft 14 and the rotary member or disc 17. Turning of the shaft 14 will drive the rotary workpiece support heads 2a, 3a and 4a through the medium of the spiral gears 15 and 16. The direction of turning of the shaft 14 is indicated by the arrow shown at the disc 17, such turning being clockwise as viewed from the left end of the apparatus. The turning of these parts continues until one of the pins 18 of the disc 17 strikes the surface 19a (Fig. 3) of the fixed stop 19. Such engagement is, for example, illustrated in Fig. 1. At that instant all movement of the various parts of the drive means connected with each other is immediately halted. That is, the disc 17 halts, the drive shaft 14 halts, the work support heads 2a, 3a and 4a halt, as do also the pulleys 12 and 11 and the motor 10. The work support heads 2a, 3a and 4a are now positioned properly and at rest, for the performing of the desired profile milling or engraving operations. These positions of the work support heads are preselected or predetermined by the particular location of the pin or stop lug 18 which has been engaged with the fixed stop 19.

After the milling or other machining operation on the workpieces carried by the work support heads 2a, 3a and 4a has been completed, the milling or cutting tools with their spindles are removed from the workpieces, in directions away from the plane of the paper, considering Fig. 1. As already mentioned above, this is effected by a proper shifting of carriage 6 which carries the tools, said carriage moving from right to left as seen in Fig. 1. During such right-to-left movement of the tool carriage 6 the abutment screw 25 thereof engages the slide 23 and also shifts the latter from right to left, thereby causing the shaft 20 and levers 21 and 22 to have counterclockwise movement as seen in Fig. 1. A spring 22a may be connected with the lever 22 to bias the same and the lever 21 in a clockwise direction, thereby maintaining the latter lever in engagement with the slide 23, as will be understood. Counterclockwise shifting of the lever 22 will cause it to engage and shift from left to right the pin 18 which has abutted the fixed stop 19. The pin 18 is shifted so that its left end is completely flush with the left face of the disc 17 as seen in Fig. 1.

This shifting of the stop pin or lug 18 disengages it from the stop 19 on the machine frame, thereby releasing the drive means between the motor 10 and the workpiece supporting heads 2a, 3a and 4a. In consequence, the motor 10, immediately starts up, turning the drive shaft 14 as indicated by the arrow. This turning now continues until the next pin 18 carried by the disc 17 strikes the fixed stop 19, again causing a complete halting of the motor, drive means and work support heads. Within the course of one complete revolution of the program disc 17 this starting and stopping will be repeated as often as there are stop pins 18 carried by the disc.

The shifting of the pins 18 from left to right after they have engaged the fixed stop 19 will cause the right end portions of the pins to project from the right face of the disc 17. As the disc continues to rotate, the shifted pins 18 will be brought into engagement with the fixed cam 26a, which has a slope similar to a spiral or screw thread.

As the disc 17 turns further, the shifted pins 18 which have been moved to effect release of the disc 17 will now be returned or moved from right to left until they finally reach their original positions so as to be operative to again engage the fixed stop 19 and halt the disc 17 and the associated drive means and work support heads 2a, 3a and 4a. In the illustrated embodiment of the invention the cam 26a is so arranged that the return of the pins 18 to their initial or operative positions will be effected when the disc 17 has moved through an angle indicated as A in Fig. 3. Such arrangement of the cam 26a is also clearly seen in Fig. 4.

By the above organization and manner of operation of the control device as provided by the invention and described, a number of distinct advantages are obtained, particularly in conjunction with workpiece supports which are rotatably mounted and fully rotatable on a common carrier member, as found in profile milling and engraving machines. For one thing, the structure of the control device is extremly simple and readily understood, said structure involving relatively few components while at the same time being reliable in its operation and effecting a precise positioning of the workpiece supports 2a, 3a and 4a.

In the specific illustrated embodiment of the invention the provision of the fixed, unyieldably stop 19 provides a distinct and well-defined point of reference constituting a basis for the different, desired arcuate positions of the workpiece supports 2a, 3a and 4a. I have found that during the milling or engraving operations, the said workpiece supports are held immovable by the illustrated control device even when appreciable working pressures or forces are exerted on the workpieces carried thereby.

By constituting the rotary member as a disc which has bores for the cylindrical pins 17 there is obtained another distinct advantage. The locations and drillings of the various bores may be readily effected without difficulty, and also the pins 18 may be economically and accurately fabricated from available stock material, such as ground rod stock or the like. Moreover, the extreme simplicity and mechanical nature of the present control device embracing the movable stops carried by the disc 17 and the return cam 26a results in a reliability of action of the highest order.

Moreover, by the use of the disc 17 and the stops 18 there is a further advantage in that it is possible to locate a stop at practically any angular position on the disc. This is clearly illustrated in Fig. 3, where the bores for the pins 18 are shown as located at different distances from the center of the disc. Depending on the length of the fixed stop 19 and the pin-ejecting lever 22, the carrier for the pins 18 could be constituted as a circular ring having a radial width chosen to accommodate all desired angular positions of stops. Where such a ring would be required to have a considerable width, the release lever 22 could be replaced by a release slide arranged to be suitably shifted from left to right in response to right-to-left movement of the tool carriage 6. By the use of plates or strips as indicated at 17c in Fig. 3 instead of the cylindrical pins 18 there is the further advantage that a large area of contact will be established between the stop lugs and the fixed stop 19 so that a relatively great torque could be applied to the disc 17 even through the latter is not especially thick; thus, any tendency for the disc 17 to shift in a direction opposite to that in which it is driven by the motor 10, due to the forces exerted on the workpieces by the milling cutters, could be overcome by increasing the torque of the motor or the torque imparted to the disc by the motor. In consequence, the work support heads 2a, 3a and 4a would at all times be securely held in their adjusted positions during the machining operations.

For the purpose of providing a high static torque on the disc 17 so as to hold the work support heads 2a, 3a and 4a stationary at all times I provide a reduction in the drive means between the motor 10 and the disc. In the embodiment of the invention illustrated herein this mechanical reduction is effected by making the drive pulley 11 relatively small and the driven pulley 12 relatively large. With such organization the shaft of the motor 10 will make several revolutions to each revolution of the drive shaft 14, as will be readily understood. Because of such mechanical advantage and force ratio, the torque which is imposed on the disc 17 when the latter is at rest during the machining operations will prevent the disc and also the workpiece support heads 2a, 3a and 4a from moving even to a very slight extent. Therefore, the milling or engraving operations will be carried out with a very high degree of accuracy.

Also, in accordance with the invention I further provide an adjustable mounting means for the carrier member 1 on which the workpiece supports 2a, 3a and 4a are mounted. This adjustable mounting means enables the member 1 to be shiftable about the axis of the drive shaft 14. For this purpose, the carrier member 1 is provided with projecting studs 1a at its opposite ends, which studs are turnably carried in bearing blocks 27 and 28 disposed at the ends of the carrier member. In Figure 1 the bearing block 28 is shown in section, taken along the line 1—1 of Figure 2. By such pivotal mounting of the carrier member 1 it may be rotatably shifted about the axis of the shaft 14.

For this shifting or adjusting movement of the carrier member 1 the spiral gear drive comprising the gears 15 and 16 are of advantage since they enable a positive transmission of motion from the shaft 14 to the workpiece supports 2a, 3a and 4a regardless of the adjusted rotative position of the carrier member. To indicate the various adjusted positions of the carrier member 1 a calibrated scale 29 may be provided, connected with the member, and an index mark 30 may be carried by the bearing block 27, as shown in Fig. 1, to provide a reference for the said scale. To lock the carrier member 1 in its various adjusted positions, a lock nut 31 may be threaded on the stud 1a, as shown in Figs. 1 and 2. Tightening of the lock nut 31 against the bearing 28 will secure the stud 1a against movement by virtue of the said stud having a shoulder disposed at the inner end of the bearing block and in engagement with said block. By the foregoing adjustable mounting of the carrier member 1 various types of milling and engraving cuts may be made on the workpieces for any position of the latter, between the vertical and horizontal planes.

Moreover, the adjustment of the carrier member 1 to the desired position may be executed in a quick and simple manner, and for any such adjustment the control and programming device as provided by the invention remains fully operative and is not adversely influenced in the least. This constitutes an important feature of the present invention. By virtue of the above adjustability of the carrier member 1 the field of usefulness of the milling and engraving machine is greatly enlarged while at the same time the manner of operation remains extremely simple and easily understood.

I claim:

1. A milling machine comprising a base, a workpiece holder; means mounting the workpiece holder on the base for turning movement; a rotating field electric motor of the type capable of being stalled while continually energized without excessive current and heat occurring; drive means connected with the motor and workpiece holder to rotate the latter when the motor is turning, said drive means including a turnable rotary member having a plurality of circumferentially spaced stop lugs mounted on it, and said means being so organized that abrupt halting of the said rotary member effects a simultaneous abrupt halting of the workpiece holder and motor; a fixed stop cooperable with said stop lugs to halt the rotary member, workpiece holder and motor in different positions as determined by the stop lugs, the number and circumferential positions of the latter determining the number of rest positions and arcuate disposition of the same; a movable tool carrier adapted to travel between advanced, work-performing and retracted idle positions; and means for effecting release of the stop lugs on the rotary member from the fixed stop after start of retracting movement of the tool carrier, thereby to enable the rotary member, workpiece holder and motor to proceed until again halted by the next stop lug on the rotary member.

2. The invention as defined in claim 1, in which the said fixed stop is disposed on the machine base, and in which the stop lugs carried by the rotary member are movably mounted on said member, said release-effecting means shifting one after another the stop lugs which are engaged with the fixed stop out of such engagement each time that the tool carrier is retracted.

3. The invention as defined in claim 2, in which the rotary member is constituted as a disc rotatably mounted on the said base, said disc having a plurality of circumferentially spaced bores the axes of which are parallel to the axis of the disc, the said stop lugs being slidably mounted in the said bores.

4. The invention as defined in claim 2, in which there is means for automatically shifting the stop lugs back to their initial operative positions after they have been actuated in response to the retracting movement of the tool carrier and prior to their again reaching the said fixed stop, thereby to render said stop lugs operative to again halt the said rotary member, workpiece holder and motor.

5. The invention as defined in claim 3, in which there is a cam fixedly mounted on the base adjacent the said disc, said stop lugs which are slidable in the bores of the disc being engageable with the said fixed cam as the disc rotates, and said cam shifting the stop lugs back to their initial positions after they have been moved in response to retracting movement of tool carrier and prior to the said lugs again reaching the vicinity of the said fixed stop.

6. The invention as defined in claim 1, in which the drive means which is connected with the motor and the workpiece holder to rotate the latter effects a mechanical reduction whereby the motor shaft may rotate at a faster speed than the workpiece holder.

7. The invention as defined in claim 1, in which there are additional workpiece holders connected with the drive means so as to be driven by the motor, in which the said drive means includes a drive shaft having spiral gears and includes meshing spiral gears rigid with the workpiece holders, in which the means mounting the workpiece holders on the base includes a carrier device and means pivotally mounting said device about an axis coinciding with the axis of the drive shaft, and in which there is adjustment means for adjustably positioning the said carrier device in different arcuate positions on the said machine base.

8. The invention as defined in claim 1, in which the drive means includes a belt drive located at the said motor, and in which the rotary member is positively coupled to the workpiece holder for simultaneous turning movement therewith without slippage.

9. The invention as defined in claim 2, in which the means for effecting release of the stop lugs of the rotary member includes a movable pusher member juxtaposed to the fixed stop and engageable with the said stop lugs.

10. The invention as defined in claim 3, in which the rotary member constituted as a disc has a side face from which the stop lugs project, said side face being closely juxtaposed to the said fixed stop.

11. The invention as defined in claim 3, in which the stop lugs are constituted as cylindrical pins, and in which the bores in the disc are circular.

12. The invention as defined in claim 3 in which the said stop lugs carried by the rotary member constituted as a disc comprise strips having a polygonal cross section.

13. The invention as defined in claim 12, in which the strips constituting the said stop lugs have opposite expansive surfaces one of which is adapted to engage the said fixed stop.

References Cited in the file of this patent

UNITED STATES PATENTS

| | | |
|---|---|---|
| 2,169,308 | Wagner et al. | Aug. 15, 1939 |
| 2,209,858 | Steiert | July 30, 1940 |
| 2,706,858 | King | Apr. 26, 1955 |